United States Patent Office 2,828,287
Patented Mar. 25, 1958

2,828,287
FLUOROALDEHYDE-MODIFIED POLYOXY-
METHYLENE

Theodore Le Sueur Cairns, Greenville, and Edward Terry Cline and Peter Joseph Graham, Wilmington, Del., assignors to E. I. du Pont de Nemours and Company, Wilmington, Del., a corporation of Delaware No Drawing. Application December 1, 1955
Serial No. 550,497

4 Claims. (Cl. 260—67)

This invention relates to new compositions of matter and to methods for their preparation, and, more particularly, it relates to fluoroaldehyde-modified polyoxymethylenes.

It is known that formaldehyde reacts with cinnamaldehyde at temperatures above 50° C., and it is also known that formaldehyde polymerizes in acetaldehyde. The products obtained in both instances are brittle, have poor thermal stability, and, hence, have little or no commercial value.

It is an object of this invention to provide a novel composition comprising a fluoroaldehyde-modified polyoxymethylene. It is another object of this invention to provide a normally solid, high molecular weight composition comprising a polyoxymethylene containing units of a fluoroaldehyde therein. It is still another object of this invention to provide a process for preparing a high molecular weight polyoxymethylene modified with a fluoroaldehyde. Other objects will become apparent in the more detailed explanation of this invention given below.

The above objects are accomplished in accordance with this invention by introducing substantially pure, monomeric formaldehyde into a liquid hydrocarbon reaction medium containing a polymerization initiator and a fluoroaldehyde under conditions favoring the continuous polymerization of the formaldehyde as it is introduced into the medium, and recovering fluoroaldehyde-modified polyoxymethylene.

In one method of operation, monomeric formaldehyde, at least 99.9% pure, is contacted with a liquid hydrocarbon reaction medium containing at least 0.01% by weight of the monomeric formaldehyde of a fluoroaldehyde and from about 0.00001% to about 0.03% or more, by weight of the monomeric formaldehyde, of a quaternary ammonium salt as a polymerization initiator.

A convenient and practical way of operating is to sweep monomeric formaldehyde at atmospheric pressure through purifying traps held at −15° C., then into the top of a reaction chamber held at ordinary room temperature and containing a rapidly agitated cyclohexane solution of a formaldehyde polymerization initiator such as a quaternary ammonium acetate, and a fluoroaldehyde. The fluoroaldehyde-modified polyoxymethylene separates from solution as it is formed, and is isolated by filtration and vacuum dried at room tempearture.

The examples which follow are submitted to illustrate and not to limit this invention. Parts are by weight, unless otherwise stated.

Example I

Highly purified gaseous monomeric formaldehyde was prepared from the hemiformal of cyclohexanol. The hemiformal was pumped at about 15 parts per mintue into an insulated vessel which was heated sufficiently to maintain it one-half full of liquid. The vapors produced by decomposition of the hemiformal, comprising formaldehyde, cyclohexanol and various impurities such as water, were led upward for about 2.5 feet through an insulated tube, then downward through a water-cooled bulb condenser, and then through a straight bore condenser cooled by acetone circulating at −15° C. through the jacket. The condensate which collected at the bottom of the condenser was discarded. The vapors were then passed upward through a bulb condenser, the interior walls of the condenser being covered with a downward flowing, countercurrent stream of cyclohexane which had been freshly dried by passage through a silica gel column. The scrubbed gas was then passed through a vessel cooled with ice water in order to remove most of the cyclohexane which had been picked up in the scrubber. Finally, the gas was passed through a series of three U-tubes cooled at −15° C. and packed with stainless steel wire-mesh saddles. All of the aforementioned equipment was glass or glass-lined, and it had been purified by baking before assembly followed by being flushed with dry nitrogen to exclude water after assembly.

The thus purified formaldehyde gas was passed at about 3 parts per minute into the top of a baffled polymerization vessel, which was fitted with a stirrer so placed as to provide violent agitation of the liquid contents. An exit tube from the vessel was connected in series, first, with an empty trap, and then with a trap partly filled with an inert liquid, through which the off-gas could bubble. The final bubbler served to indicate the rate of gas absorption in the polymerization vessel.

Prior to connecting the polymerization vessel with the rest of the equipment the vessel was charged with 217 parts of toluene which had been freshly dried by passage through a silica gel column. The vessel was placed in a solid carbon dioxide-cooled bath, and flushed with dry nitrogen to exclude water. When the vessel was cool, 9.4 parts of trifluoroacetaldehyde vapors was dissolved in the toluene. Just before the vessel was connected with the rest of the equipment 0.00025 part of dimethyl di(70% octadecyl, 30% hexadecyl)ammonium acetate, a formaldehyde polymerization initiator, was added.

After the polymerization vessel was placed in a bath maintained at −35° C., it was connected with the rest of the equipment, and the agitator was started. Absorption of the gaseous formaldehyde was so rapid that the stirrer had to be run only part time during the first 8.5 minutes in order to prevent the liquid in the final bubbler from being sucked back into the empty trap. After a total of 10 minutes the polymerization vessel was disconnected and the slurry of polymer in toluene was filtered. The filter cake was washed with ether and then continuously extracted overnight with ether. The product was allowed to dry in air and found to weigh 19 parts. It analyzed 17.2% fluorine, which corresponds to a trifluoroacetaldehyde content of 29.5%. Its inherent viscosity was 2.85, as measured in a 0.5% solution in dimethylformamide at 150° C.

Fourteen parts of the product was acetylated under nitrogen by treatment with a refluxing mixture of 226 parts of acetic anhydride and 24.6 parts of pyridine for 10 minutes. The acetylated polymer was thoroughly washed and mixed with 0.1% of di-β-naphthyl-p-phenylenediamine as a thermal stabilizer. Nine parts of acetylated product was obtained.

The acetylated material analyzed 8.25% fluorine, corresponding to a trifluoroacetaldehyde content of 14.2%. When pressed at 190° C., it formed a tough film which could be manually creased at 180° without forming any cracks along the crease line. In a film brittleness test the film remained tough down to −78° C. If the film brittleness temperature is lower than about −70° C. an excellent toughness is indicated for the product. The film brittleness test is accomplished by cooling a film strip successively to lower and lower temperatures while the film is creased under carefully controlled conditions between the jaws of an oversize spring-loaded clothespin. The creasing is accomplished by slowly and uniformly allowing the clothespin jaws to shut during the cooling period. The temperature at which half of the strips, tested in series, break is taken as the film brittleness temperature. The film for this test is prepared by pressing 1.15 g. of vacuum-dried polymer in a 2.5 inches x 0.5 inch bar mold at 40,000 lbs. total pressure for 1.5 minutes. The bar is placed in a 1⅞ inches x 2½ inches x 10 mil-thick film frame and pressed between sheets of aluminum foil at 40,000 lbs. total pressure for 1.5 minutes in a press preheated to 195° C. The press is cooled with water and the film removed.

In a film-pressing test at 200° C. for 5 minutes, wherein 0.500 g. of polymer was pressed at 3000 lbs. total pressure between sheets of aluminum foil, the fluoroaldehyde modified acetylated material lost only 2.1% of its weight. This indicates a good degree of thermal stability as compared with unmodified, acetylated polyoxymethylene. For instance, values of 1.4 and 0.54% weight loss were obtained for controls.

In another thermal stability test, the syringe stability at 222° C. of the acetylated product was 35 ml./g. between 10 and 20 minutes as compared with values for controls of 41 and >42. In this test a 0.75 inch diameter disk is cold-pressed from 0.6–0.7 g. of dry polymer at room temperature and at a total pressure of 12,000 lbs. for 2 minutes. The disk is placed in a 50 ml. syringe which is flushed with nitrogen and partly filled with an oxidation and heat-resistant silicone oil having a freezing point of −50° C. and a viscosity of 149 centistokes at 25° C. All but about 5 ml. of the oil is extruded and the end of the syringe is closed with a polytetrafluoroethylene plug. The syringe is placed in a 222° C. vapor bath and the volume of gas evolved from the polymer disk is recorded at intervals by observing the movement of the syringe piston. The results are expressed in terms of milliliters of gas evolved per gram of polymer during specified time intervals.

*Example II*

Purified, gaseous formaldehyde prepared essentially as in Example I, was passed into a polymerization vessel which previously had been charged with 260 parts of toluene (freshly dried by passage through a silica gel column), 0.0003 part of the quaternary ammonium salt initiator of Example I, and 25.4 parts of trifluoroacetaldehyde. The polymerization was carried out as described in Example I. Formaldehyde gas was passed into the polymerization vessel for a period of 31 minutes, after which the vessel was disconnected and allowed to warm to room temperature. The next day the slurry was filtered and the filter cake washed with ether and then continuously extracted with ether for seven hours.

The product was allowed to dry in air and was found to weigh 12 parts. It analyzed 40.8% fluorine, which corresponds to a trifluoroacetaldehyde content of 70%. Its inherent viscosity was 0.27 in dimethylformamide. A film pressed at 190° C. was much more flexible and rubbery than that from a polyoxymethylene control. The polymer lost 57% in weight in the 200° C./5 min./3000 lbs. film pressing test (Example I). In a reprecipitation test an aliquot was twice dissolved in dimethylformamide under refluxing conditions and then precipitated by cooling and washed exhaustively with acetone. The recovered polymer, which amounted to 27% of the original aliquot, analyzed 20.6% fluorine, which corresponds to a trifluoroacetaldehyde content of 35%.

Another aliquot of the product was acetylated as described in Example I and recovered in 67% yield. The product was swollen to a greater extent by the acetylating solution and by the acetone used for washing, than was an unmodified polyoxymethylene control sample. The acetylated material lost only 3.6% in weight in the 200° C./5 min./3000 lb. film pressing test (Example I), indicating a much higher degree of heat stability than before acetylation.

*Example III*

A polymerization vessel was charged with 467 parts of cyclohexane, freshly dried by passage through a silica gel column. Seventy-eight parts of liquid was distilled from the vessel to remove remaining traces of water. The vessel was cooled in an ice-water bath, while a gentle stream of dry nitrogen was passed through it and 15.5 parts of heptafluorobutyraldehyde was added. After being transferred to a bath kept at 15° C., the vessel was connected with a purified formaldehyde gas stream (Example I) and an off-gas trap and bubbler. Over a period of 36 minutes, 0.0045 part of quaternary initiator (Example I) was added stepwise to the reaction medium while formaldehyde gas was being continuously introduced into the vessel. At this point there was added 0.01 part of triphenylphosphine, another formaldehyde polymerization initiator. The polymerization was continued for an additional 10 minutes, following which the slurry was filtered and the cake washed with acetone and then continuously extracted with acetone overnight. The extracted polymer was vacuum dried and found to weigh 6 parts. It analyzed 48.9% fluorine, which corresponds to a heptafluorobutyraldehyde content of 73%. It had an inherent viscosity of 0.27 in dimethylformamide.

An aliquot of the product was acetylated in solution by heating and stirring it with 18 parts (per part of polymer) of acetic anhydride and 0.0067 (part of anhydrous sodium acetate in a nitrogen atmosphere in a closed system under reflux at a total nitrogen pressure of about 1.88 atmospheres until the polymer dissolved. At this point a thermometer located in a well extending into the solution registered 149° C. The excess nitrogen pressure was vented off and the heating and stirring continued under reflux at one atmosphere under a nitrogen blanket. Thirty minutes from the time at which the solution first reached 138° C., the polymer was precipitated rapidly from solution by applying a vacuum to the system. The polymer was filtered, exhaustively washed with acetone, water and acetone, and finally stabilized with 0.1% of the aryl diamine shown in Example I. Polymer recovery was 87%. The acetylated polymer analyzed 49.9% fluorine, which corresponds to a heptafluorobutyraldehyde content of 74%.

*Example IV*

A polymerization was carried out as in Example III, except that only 7.7 parts of heptafluorobutyraldehyde was present in the original solution. During the first 10 minutes of the polymerization 0.0015 part of the quaternary ammonium initiator of Example I was added in 2 portions. At this point addition of triphenylphosphine was begun and during the next 17 minutes 0.008 part of this initiator was added in four increments. Polymeric particles were observed in the reaction vessel, and formaldehyde gas was passed into the vessel for an additional 10 minutes. The reaction temperature was controlled throughout the polymerization by surrounding the polymerization vessel with a bath maintained at 14° C. The polymer which had formed was filtered off, washed with acetone, and continuously extracted with acetone overnight. It was vacuum-dried and found to weigh 15 parts.

Thirteen and one-half parts of the extracted product was acetylated in solution as described in Example III. During the heating and stirring under elevated pressure of nitrogen, the mixture was slightly cloudy even when the thermometer in the well indicated a temperature of 160° C. Nevertheless, at this point the excess nitrogen pressure was vented and the rest of the acetylation, washing and addition of antioxidant was carried out as in Example III. The acetylated material weighed 12.6 parts. It was analyzed for fluorine in duplicate determinations which averaged 14.7%, corresponding to a heptafluorobutyraldehyde content of 22%. Its inherent viscosity was 1.60 as measured at 60° C. in 0.5% solution in parachlorophenol containing 2% alpha-pinene. In the 200° C./5 min./3000 lb. film pressing test (Example I) the film lost only 0.5% in weight. In the syringe stability test at 222° C. the material evolved 48 ml./g. between 0 and 10 minutes.

When pressed at 190° C. the acetylated material formed a tough film which could be creased and recreased without cracking. Its film brittleness temperature (Example I) was —72° C. The product was well suited to injection molding, as judged by the flow rate of the product under pressure at an elevated temperated. In an extrusion test, an aliquot was heated in a cylinder at 200° C. The cylinder was fitted at the bottom with an orifice having a diameter of 0.0413 inch and a length of 0.158 inch. In addition, the cylinder was equipped with a tight fitting piston having a diameter of 0.373 inch. The mass of the piston plus a weight thereon was 5060 grams. The orifice was closed for the first 4.5 minutes with a polytetrafluoroethylene plug. The plug was removed and the extrudate collected during the period between 5 and 6 minutes and the period between 6 and 7 minutes. The extrudate was found to weight 0.11 and 4.12 g. respectively. This compares with values of 0.03 and 0.03 g. for an unmodified polyoxymethylene control having an inherent viscosity of 2.1 at 0.5% concentration in parachlorophenol containing 2% alpha-pinene.

In place of the specific fluoroaldehydes of the examples there may be used any fluoroaldehyde of the general formula $XC_nF_{2n}CHO$, in which X is hydrogen or fluorine and n is an integer from 1 to 4. Examples of such fluoroaldehydes are difluoroacetaldehyde, hexafluorobutyraldehyde, octafluoropentanal-1, and the like.

The amount of fluoroaldehyde used is at least 0.01% by weight of the monomeric formaldehyde being processed. As a rule the amount of fluoroaldehyde will be between 1 and 50% by weight of the monomeric formaldehyde being processed.

In practice the fluoroaldehyde is dissolved in the reaction medium and the formaldehyde generally is passed into the space above the agitated reaction medium. If desired, however, instead of having the fluoroaldehyde in solution in the reaction medium, it may either be premixed with the monomeric formaldehyde or it may be injected simultaneously with the monomeric formaldehyde.

The reaction medium is preferably one which is a nonsolvent for polymeric formaldehyde but is a solvent for the fluoroaldehyde. The medium is also one which remains liquid under the temperature conditions used in the polymerization and which is essentially anhydrous. Alkanes of the $C_5$ to $C_{10}$ range and mixtures thereof are preferred reaction media because of their availability and low cost, and because they fulfill the aforementioned requirements. In place of these, there can be used other saturated hydrocarbons such as cyclohexane, methyl cyclohexane, isobutane, and the like.

Reaction media which dissolve appreciable amounts of monomeric formaldehyde can also be used. Specific examples are diethyl ether, benzene, toluene, and the like.

The amount of reaction medium can be from 1.5 to 1000 or more times the weight of the monomeric formaldehyde being processed, depending on, among other things, whether a batch or continuous process is being utilized. Because good results are obtainable when the reaction medium is between 4 and 100 times the weight of the formaldehyde being processed that constitutes the amount of reaction medium preferably employed.

The polymerization is effected in the presence of known initiators for the polymerization of formaldehyde to polyoxymethylene. Examples of such initiators are the trihydrocarbon phosphines, stibines and arsines disclosed in the copending application of R. N. MacDonald, U. S. Ser. No. 365,235, filed June 30, 1953; the tertiary amine-containing polymers disclosed in copending application of M. F. Bechtold and R. N. MacDonald, U. S. Ser. No. 365,278, filed June 30, 1953; the metal carbonyls disclosed in U. S. Patent 2,734,889, issued to F. C. Starr, Jr., on February 14, 1956; the metalorganic compounds disclosed in copending application of W. P. Langsdorf, Jr., and G. S. Stamatoff, U. S. Ser. No. 423,855, filed April 16, 1954; and the onium salts, including quaternary ammonium salts and quaternary phosphonium salts, disclosed in copending application of H. H. Goodman, Jr., and L. T. Sherwood, Jr., U. S. Ser. No. 521,878, filed July 13, 1955.

As shown in the working examples, acylation leads to improved thermal stability and this after-treatment is therefore generally given the polymer if its ultimate use entails resistance to heat-degradation.

The amount of formaldehyde polymerization catalyst can vary from about 0.00001% to about 0.03% or more by weight of the monomeric formaldehyde.

The polymerization of the formaldehyde is effected at temperatures which can be as low as the freezing point of the liquid reaction medium or as high as the boiling point of the reaction medium. The particular temperature selected depends upon the initiator used, reaction medium, and other conditions. The temperature selected is that at which polyoxymethylene is formed rapidly and with minimum of apparatus requirements. As a rule these conditions are fulfilled in the range of —50° to +50° C. and this, therefore, embraces the temperature usually employed. In general, the process employed is that described in U. S. Patent 2,768,994, issued to R. N. MacDonald on October 30, 1956.

Monomeric formaldehyde from any source can be used in the practice of this invention. Pyrolysis of alpha-polyoxymethylene is a convenient source of monomeric formaldehyde. In any case before introduction into the polymerization zone the formaldehyde should be rigorously purified in the manner described in Example I, or in any other manner which will reduce the concentration of water and all other impurities to less than 0.1%, while the remainder is formaldehyde.

The fluoroaldehyde-modified formaldehyde polymers of this invention yield tough, clear sheets and moldings, particular structures, such as, fibers, films, and bristles and other articles made from synthetic resins. These formaldehyde polymers possess a high order of thermal stability and retain toughness on aging. They are therefore valuable in commerce and are the first fluorine-containing formaldehyde polymers known.

We claim:
1. A normally solid, high molecular weight polymeric composition prepared by subjecting a liquid hydrocarbon solution of a mixture of formaldehyde and a fluoroaldehyde having the general formula

$$XC_nF_{2n}CHO$$

wherein X is a member of the group consisting of hydrogen and fluorine and n is any integer from 1 to 4, to a temperature between the freezing point and the boiling point of said solution in the presence of an initiator for the polymerization of formaldehyde to polyoxymethylene.

2. The process of preparing a high molecular weight polyoxymethylene modified with fluoroaldehyde comprising continuously polymerizing substantially pure formaldehyde in a liquid hydrocarbon reaction medium containing an initiator capable of polymerizing said formaldehyde to said polyoxymethylene and a fluoroaldehyde having the general formula:

$$XC_nF_{2n}CHO$$

wherein X is a member of the group consisting of hydrogen and fluorine and n is an integer from 1 to 4, and recovering a high molecular weight polyoxymethylene modified by the presence of said fluoroaldehyde in the structure of said polyoxymethylene.

3. A fiber comprising the composition of claim 1.
4. A film comprising the composition of claim 1.

References Cited in the file of this patent
UNITED STATES PATENTS 2,568,500    Husted et al. _____ Sept. 18, 1951

U. S. DEPARTMENT OF COMMERCE
PATENT OFFICE

CERTIFICATE OF CORRECTION

Patent No. 2,828,287                            March 25, 1958

Theodore Le Sueur Cairns et al.

It is hereby certified that error appears in the printed specification of the above numbered patent requiring correction and that the said Letters Patent should read as corrected below.

Column 5, line 17, for "to weight 0.11 and 4.12 g." read -- to weigh 0.11 and 0.12 g. --; line 59, for "obtainable" read -- obtained --.

Signed and sealed this 6th day of May 1958.

(SEAL)
Attest:

KARL H. AXLINE
Attesting Officer

ROBERT C. WATSON
Commissioner of Patents